(12) United States Patent
Guccione et al.

(10) Patent No.: US 11,363,009 B2
(45) Date of Patent: Jun. 14, 2022

(54) SYSTEM AND METHOD FOR PROVIDING SECURE CLOUD-BASED SINGLE SIGN-ON CONNECTIONS USING A SECURITY SERVICE PROVIDER HAVING ZERO-KNOWLEDGE ARCHITECTURE

(71) Applicant: Keeper Security, Inc., Chicago, IL (US)

(72) Inventors: Darren S. Guccione, Chicago, IL (US); Craig B. Lurey, El Dorado Hills, CA (US)

(73) Assignee: KEEPER SECURITY, INC., Chicago, IL (US)

( * ) Notice: Subject to any disclaimer, the term of this patent is extended or adjusted under 35 U.S.C. 154(b) by 99 days.

(21) Appl. No.: 16/863,192

(22) Filed: Apr. 30, 2020

(65) Prior Publication Data

US 2021/0266309 A1 Aug. 26, 2021

Related U.S. Application Data

(60) Provisional application No. 62/982,018, filed on Feb. 26, 2020.

(51) Int. Cl.
| | |
|---|---|
| *H04L 29/06* | (2006.01) |
| *H04L 9/40* | (2022.01) |
| *H04L 9/32* | (2006.01) |
| *H04L 9/08* | (2006.01) |
| *H04L 9/06* | (2006.01) |
| *H04L 9/30* | (2006.01) |

(52) U.S. Cl.
CPC ........ *H04L 63/0815* (2013.01); *H04L 9/0631* (2013.01); *H04L 9/0825* (2013.01); *H04L 9/0866* (2013.01); *H04L 9/0894* (2013.01); *H04L 9/3073* (2013.01); *H04L 9/3221* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 2003/0028664 A1* | 2/2003 | Tan ..................... | G06F 21/10 709/237 |
| 2004/0133908 A1* | 7/2004 | Smith .............. | H04N 21/47211 725/31 |

(Continued)

*Primary Examiner* — Benjamin E Lanier
(74) *Attorney, Agent, or Firm* — Klintworth & Rozenblat IP LLP

(57) ABSTRACT

Systems and methods for providing secure single sign-on authentication and management of encrypted vault in a fully cloud-based zero-knowledge environment. A user on a client device attempts to use a network resource. The user is directed to login to the identity provider. The identity provider authenticates the user through a login process. If the user is identified to be a valid user, the identity provider sends the user an attestation sign-on key to confirm the user is valid. The client device sends the attestation sign-on key to a vault service provider, which verifies the attestation using a configured public key. The client device retrieves a data decryption key and an encrypted data key, which are stored in different entities in the system. The encrypted data key is decrypted on the client device using the data decryption key.

18 Claims, 10 Drawing Sheets

(56) References Cited

U.S. PATENT DOCUMENTS

| | | | |
|---|---|---|---|
| 2007/0040699 A1* | 2/2007 | Khairullah | G06Q 30/08 340/6.12 |
| 2007/0214369 A1* | 9/2007 | Roberts | G06F 21/79 713/192 |
| 2011/0293098 A1* | 12/2011 | Fu | H04L 9/3263 380/286 |
| 2012/0174198 A1* | 7/2012 | Gould | G06F 21/335 726/6 |
| 2014/0164774 A1* | 6/2014 | Nord | G06F 9/00 713/171 |
| 2014/0304505 A1* | 10/2014 | Dawson | H04L 63/0428 713/165 |
| 2015/0220914 A1* | 8/2015 | Purves | G06Q 20/36 705/26.8 |
| 2016/0344561 A1* | 11/2016 | Grajek | H04L 63/0823 |

\* cited by examiner

SYSTEM AND METHOD FOR PROVIDING SECURE CLOUD-BASED SINGLE SIGN-ON CONNECTIONS USING A SECURITY SERVICE PROVIDER HAVING ZERO-KNOWLEDGE ARCHITECTURE

CLAIM OF PRIORITY AND RELATED APPLICATIONS

Claim of priority is made to U.S. Provisional Patent Application Ser. No. 62/982,018, filed on Feb. 26, 2020, and incorporated by reference herein in its entirety.

U.S. Pat. No. 10,356,079 is hereby incorporated by reference in its entirety.

BACKGROUND

Single Sign-On (SSO) schemes allow a user to login to, or at least access, one or more service providers or other resources that require login procedures by performing a single login procedure. SSO typically operates in conjunction with an identity provider, or entities that authenticate user identities. Many known identity providers are widely used, such as, for example, Okta, Azure, Active Directory Federation Services ("AD FS"), and others. A vault service provider may be used to manage passwords and other information that requires secure maintenance in a digital vault.

SSO schemes may involve both a vault service provider to provide the secure storage of data and account information for users and the identity provider ("IdP") to provide identity confirmation in allowing users to login to multiple service providers in a single login. There is a preference for using zero-knowledge vault security in the vault service provider. The idea behind SSO is to simplify the task of maintaining secure access to a user's resources while increased security imposes on users to have to set and learn many passwords. Using an identity provider can incorporate or add as associated (e.g. federated) service providers, a variety of resources. The identity provider may configure a user's security data and thereby reduce or simplify the steps required by the user to access their many resources and use the vault service provider to secure the user's security data.

Users may have accounts or subscriptions on a substantial number of service providers, subscriptions, and other resources on the Internet on which they rely in their everyday lives. While the SSO scheme that operates with a password management system simplifies the users' tasks for maintaining security on their devices, several complications typically arise. First, today's users may own and use a smartphone, a tablet computer, and/or a laptop or desktop computer. Such users usually want to be able to access their resources using any of their other devices. For example, a user may perform most computing tasks using services such as Facebook™, eBay™, banking, or others on one of their devices (e.g. on a laptop). That same user may also want to access all such services on other devices (e.g. smartphone, tablet, etc.). The ability to securely access the same resources from multiple devices may be as desirable in business settings as in personal computing environments. In business settings there may also be a desire for increased security as sensitive enterprise data may be communicated by the user in the business setting.

Ultimately, known methods for SSO authentication may be helpful to users in simplifying their ability to access resources on the internet on any of their devices, such methods may make administration of the computing resources of the subject users more complicated. The implementations typically involve an on-premises or user-hosted application service installed during configuration of the SSO system. For personal computing users, this adds an extra step and layer of complexity to a solution that is intended to simplify the user's access to resources. For users in a business setting, the requirement of premises hosted application services may add some burden to administrators of the enterprise network. In addition, the required application services may require additional network transactions involving the transmission of secure data, which may impact the security of such data.

SUMMARY

In view of the above, a computer-implemented method is provided for facilitating a single sign-on to a digital vault provided by a vault service provider. In one aspect, a user on a client device performs a login process to an identity provider. In response to the login at the identity provider, a signed attestation generated by the identity provider is received by the client device. The signed attestation and a device identifier are sent in a communication to the vault service provider, which is configured to verify the signed attestation. An encrypted data key corresponding to the user and device identifier is retrieved in a zero-knowledge environment and used to generate a data key with a data decryption key. Encrypted data records stored in a local storage are decrypted using the data key.

In one aspect, the encrypted data key is retrieved from the vault service provider in response to confirmation of the user's identity via an attestation public key. The encrypted data key is received from the vault service provider and decrypted using the data decryption key. The data decryption key is a data private key (DPRIV) previously generated in a key pair with a data public key (DPUB), where the DPRIV key is stored in local storage.

In another aspect, a user registers a first client device corresponding to the user by generating a data key and the key pair, where the DPUB key is sent to the vault service provider for storage. The first client device encrypts the data key using the DPRIV key and sends the encrypted data key to the vault service provider for storage.

In another aspect, a user registers another client device after registering at least the first client device by generating a second key pair with a second data public key (DPUB) and a second data private key (DPRIV). The user uses the unregistered client device to request registration from the vault service provider using an approval mechanism, which may be a previously registered client device, or an admin.

In another aspect, the data decryption key is a single-sign-on key (SSOK) generated by the vault service provider. The step of retrieving the encrypted data key involves reading the encrypted data from local storage. Upon receiving the SSOK key from the vault service provider in response to confirming the identity of the user and the device, the SSOK key is used to decrypt the encrypted data key to generate the data key.

In another aspect, the user registers a first client device by generating a data key corresponding to the user and client device, and generating a unique device ID. The first client device receives the SSOK key from the vault service provider and uses the SSOK key to encrypt the data key. The encrypted data key is stored locally. The SSOK key is deleted from the first client device.

DETAILED DESCRIPTION

Figure 1A:
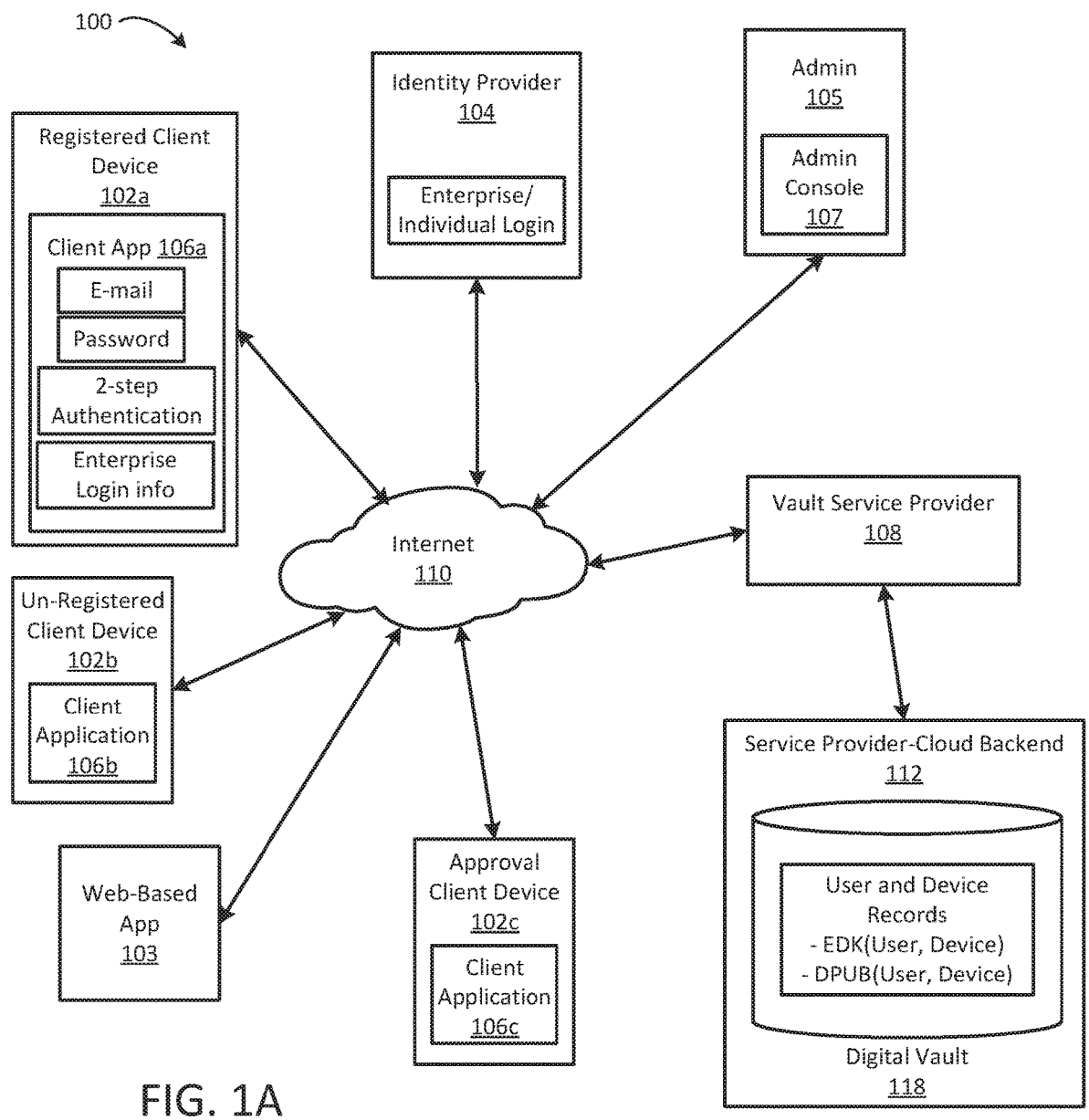
FIG. 1A is a block diagram of an example implementation of a system for authenticating a user and decrypting stored data in a zero-knowledge architecture in a single sign-on environment.

The following describes systems and methods for single sign-on (SSO) authentication using a secure vault provide data security in a single sign-on environment without requiring the user to download on-premises software from the vault service provider. The vault service provider may be implemented as a cloud server. The IdP may be any known or similar identity provider, such as, for example, Okta, Azure, Active Directory Federation Services ("AD FS"), and others. A zero-knowledge environment is preserved because the vault service provider cloud server stores sensitive user data in a vault implemented in the vault service provider cloud backend. Sensitive data is transported in encrypted form and only decrypted for use on the user's client device. The vault service provider does not have access to the data key.

In example implementations, the data key of the user may be decrypted with a data decryption key stored separately from an encrypted form of the data key. In one example implementation, the data decryption key may be stored in local storage of the client device used by the user to decrypt the encrypted data key to generate the data key. The encrypted data key may be stored on the vault service provider in a vault corresponding to the user and provided to the user upon successful authentication by the IdP. The data decryption key may also be stored on the vault service provider in a vault corresponding to the user and provided to the user upon successful authentication by the IdP. The user may then decrypt the encrypted data key using the data decryption key to generate the data key.

Examples of implementations described below may be advantageously used by individual users or by enterprises to manage access to resources on the Internet easily and in a secure manner. A user of an example implementation launches or starts up a client application for the first time on a client device. The client application provides the user with a user interface to the SSO system with zero knowledge environment secure storage, allows the user to create an IdP account, and provides the user with tools to register client devices on which the user can access the same resources in a secure SSO environment.

The client application may be a program the user may download from the vault service provider. The client application may also be implemented as a webpage having a sign-on resource to establish a session with the vault service provider or other associated resources (e.g. federated resources) to which the user has access in the SSO system. The client application may be configured to walk the user through the process of connecting to an Identity Provider (IdP) to setup a SSO account for which the user establishes a username and password. When the user has established an account on the IdP, the IdP is configured to confirm the identity of the user each time the user logs in to the IdP. For example, the IdP may create a signed attestation comprising an attestation, which may be a document or data element, that is signed using an attestation signing key (ASK). The signed attestation may be validated by the vault service provider using an attestation public key (APK). When the user establishes an account on the vault service provider, the identity provider may generate the APK/ASK key pair and send the APK to the vault service provider. The ASK is maintained by the IdP and used to create the signed attestation using the ASK upon confirmation of the user's identity when the user logs in. Alternatively, the signed attestation may be generated upon configuration and provided to the user each time the user's identity is confirmed.

During configuration of the user's account, the IdP may require the user to establish certain security mechanisms to assist the IdP in confirming the user's identity. For example, the IdP may require two-factor authentication. Such authentication may involve recording a user's fingerprint, agree to receiving a code at a user's email address or phone number to enter after acceptance of the user's password, and other mechanisms for two-factor authentication. The configuration of the user's SSO account with the IdP may also be associated with configuring a user account on the vault service provider. Alternatively, the user may already have an account on the vault service provider as well as on other service providers offering resources on which the user has membership or an account.

During configuration, the user may request access to the vault service provider as an associated resource to which the user can log into with a single sign-on. The IdP may connect to the vault service provider to configure authentication for the user on the vault service provider via the SSO system provided by the IdP. In an example implementation, the IdP sends the APK corresponding to the user to the vault service provider. The vault service provider stores the APK in connection with the user's account on the vault service provider. A similar process may be followed with other associated service providers.

In an example implementation, the vault service provider is used to store the user's secure data including data used for connecting to other associated resources. Such secure data may include encryption and decryption keys needed for the other associated resources, passwords, two-factor authentication data, and any other data that the user maintains secure. As noted above, the user's secure data may be decrypted and encrypted for storage using the vault service provider. The user's secure data may be encrypted and decrypted using a data key, which may be encrypted as a symmetric encrypted data key using a separately stored data encryption or decryption key. Both the encrypted data key and the data encryption key are stored in a zero-knowledge environment. That is, storage is such that the vault service provider does not have access to the data key.

In one example implementation, the user's data key is not stored permanently anywhere, but rather an encrypted version of the data key is stored on the vault service provider in association with the user. When the user configures the SSO access to the vault service provider, or runs the client application for the first time, the client application generates a data key pair including a data public key (DPUB) and a data private key (DPRIV). The client application encrypts the data key (DK) with the DPRIV key to generate the encrypted data key described above as the EDK key. The DPUB key is also sent to the vault service provider and stored there such that the DPUB key and the EDK correspond to the user and the client device on which the user is operating the client application. Once the vault service provider stores the EDK and DPUB for the user and the client device, the client device is deemed registered for operation in the SSO configuration corresponding to the user.

After configuring the user's SSO and vault service provider accounts, and after the first device is registered, the user may have other devices on which the user may wish to access internet resources. Once the first device has been registered, the user may register other devices by using suitable already registered devices as approval mechanisms. For example, the user may install the client application on an unregistered device to begin the process of accessing resources using the SSO. The process may involve selection of an approval mechanism, which may be an already registered client device or, in an example involving an enterprise network, an admin. Example implementation of registering additional devices after the first device are described below with reference to FIGS. 4A and 4B.

In some implementations, the SSO and vault security configurations may be managed within an enterprise, where users operate their devices to access Internet resources subject to requirements and restrictions set forth by an enterprise. The users may be employees, agents, or otherwise work with or for the enterprise. The users' computing devices and the tools they use are controlled by the enterprise. The enterprise may exert its control via an administrator (admin). In establishing an SSO scheme with vault security in an enterprise, the admin may establish restrictions regarding which devices users can register and which resources the user can access. For example, the admin may be a main approval mechanism for approving registration of any client devices the user may attempt to register. The admin may be involved in approving all of a user's devices during registration of the first client device. The admin may also generate an enterprise key pair when the first device is registered. The enterprise key pair may be used as described in more detail below with reference to FIG. 4B below.

In another example implementation, the disclosed methods and systems allow the user to decrypt their vault using a single sign-on key (SSOK) stored by the vault service provider cloud to decrypt an encrypted data key (EDK) stored on the user's client device. The user may configure user accounts on the IdP and vault service provider and register client devices as described above to obtain a data key unique to the user and the SSOK unique to each of the user's client devices. Registered client devices and the admin may be used as approval mechanisms to enable registration of unregistered devices.

From an administrator's perspective, the benefits of using examples of the systems and methods described here include easy setup and no required hosted software to manage encryption keys. The user also may perform new device approval on an active device or may request their vault service provider Administrator to perform device approvals. The approval or registration of devices may be an added step to the process, however, in an enterprise setting, the administrator is given a tool for monitoring the devices the users add to the secure SSO system for the enterprise.

The notation used herein to indicate encryption of a data element (PAYLOAD) using an encryption key (KEY) is Encrypted Data element={PAYLOAD}_KEY. This notation is used in the description below for both public key and symmetric key encryption.

1. Data Key (DK): Symmetric encryption/decryption key used to decrypt the user's vault. The Data Key may be a 256 bit, or stronger Advanced Encryption Standard with Galois Counter Mode (AES-GCM) or other symmetric cipher. The Data Key is generated on the user's first client device to be registered during configuration of the user and the client device. The DK is encrypted with either a symmetric data decryption key in one example implementation, or the public key in a device key pair in another example implementation.
2. Encrypted Data Key (EDK): The data key may be encrypted using a key that is part of a key pair or a key that is symmetric. The EDK may be stored on the user's client device or in the user's vault on the vault service provider, where the EDK is stored separate from the key that decrypts the EDK. In one example implementation, the DK may be encrypted using the public key of the device key pair (DPUB): EDK={DK}_DPUB. In another implementation, the DK may be encrypted using a symmetric encryption/decryption key as described below.
3. Device Key Pair: Device Public Key (DPUB) and Device Private Key (DPRIV) generated by a client application during registration of a client device. The DPRIV key is stored in the client device being used and the DPUB key is sent to the vault service provider for storage in the vault corresponding to the user and the client device being registered. The DPUB key is used to encrypt the DK during registration. The DPRIV key is stored in local storage on the client device and used to decrypt the EDK in subsequent logins by the user on the registered client device to which the device key pair correspond. The device key pair may be any suitable asymmetric key pair such as, for example, an Elliptic-curve cryptography (ECC)-256 bit key used in an Elliptic Curve Integrated Encryption Scheme (ECIES) or similar schemes.
4. Enterprise Key Pair: Enterprise Public Key (EPUB) and Enterprise Private Key (EPRIV) generated during registration of the first of the user's client devices to be registered by an administrator console or system used to manage security for the enterprise network in which the user operates. The EPUB key is stored in the vault service provider to correspond to the user. The EPRIV key is stored in the admin system as a data record corresponding to the user.

5. Attestation signing key (ASK): used by the identity provider to sign identity attestation (e.g. in SAML assertions). In implementations described below, the use of SAML assertions is used as an example. Other suitable protocols may be used as well. The vault service provider does not have access to this key and is unable to dictate key parameters. The identity provider generates the ASK as part of an asymmetric attestation key pair. The ASK is the private key in the key pair and the attestation public key is the public key. The ASK is maintained on the identity provider and used to generate a signed attestation, which may be a certificate, or any document having a signature. The signature may be a portion of the document, or the entire document. The signature may be a code, such as for example, a section of text or random number or string of alphanumeric characters or string of elements encrypted by the identity provider using the ASK. In an example implementation, the signed attestation is an assertion according to the SAML standard.

6. Attestation public key (APK): used by Vault Service Provider cloud to verify identity attestation (SAML assertions) are valid and were issued by the configured Identity Provider (IdP). Vault Service Provider cloud stores this key when a customer administrator uploads it to Vault Service Provider during IdP configuration. The APK key may be in a key pair with the ASK implemented according to the Rivest Shamir Adelman (RSA), elliptic curve digital signature standard ("ECDSA;" NIST FIPS 186-3), Edwards-curve Digital Signature Algorithm (EDDSA) or similar asymmetric signing key standards.

7. Single Sign-On key (SSOK): Symmetric encryption/decryption key stored on the Vault Service Provider cloud that is specific to an individual customer's device. Can be 256-bit or stronger; AES-GCM or other symmetric cipher. The SSOK is not stored on the client device when the EDK is stored on the client device.

8. Encrypted Data Key (EDK): In an example implementation, the DK may be encrypted with a symmetric encryption/decryption key (e.g. EDK={DK}_SSOK), and therefore decrypted using the symmetric encryption/decryption key (e.g. DK=Decrypt_EDK (SSOK). In one implementation, the EDK is stored on the client device.

9. Device enrollment secret/public key (DESK/DEPK): One-time-use, asymmetric key pair used for decryption and encryption. Generated on the vault service provider user device; DESK is held in memory by the enrolling client; DEPK is sent to vault service provider cloud and then to the approving client to create the transport public key ciphertext. Asymmetric key pair: ECC-256 bit key used in ECIES or similar.

10. Transport Data Key Ciphertext (TDK): TDK={DK}_DEPK. Data key encrypted with Device Enrollment Public Key (DEPK) for transport to an enrolling device.

Figure 1B:
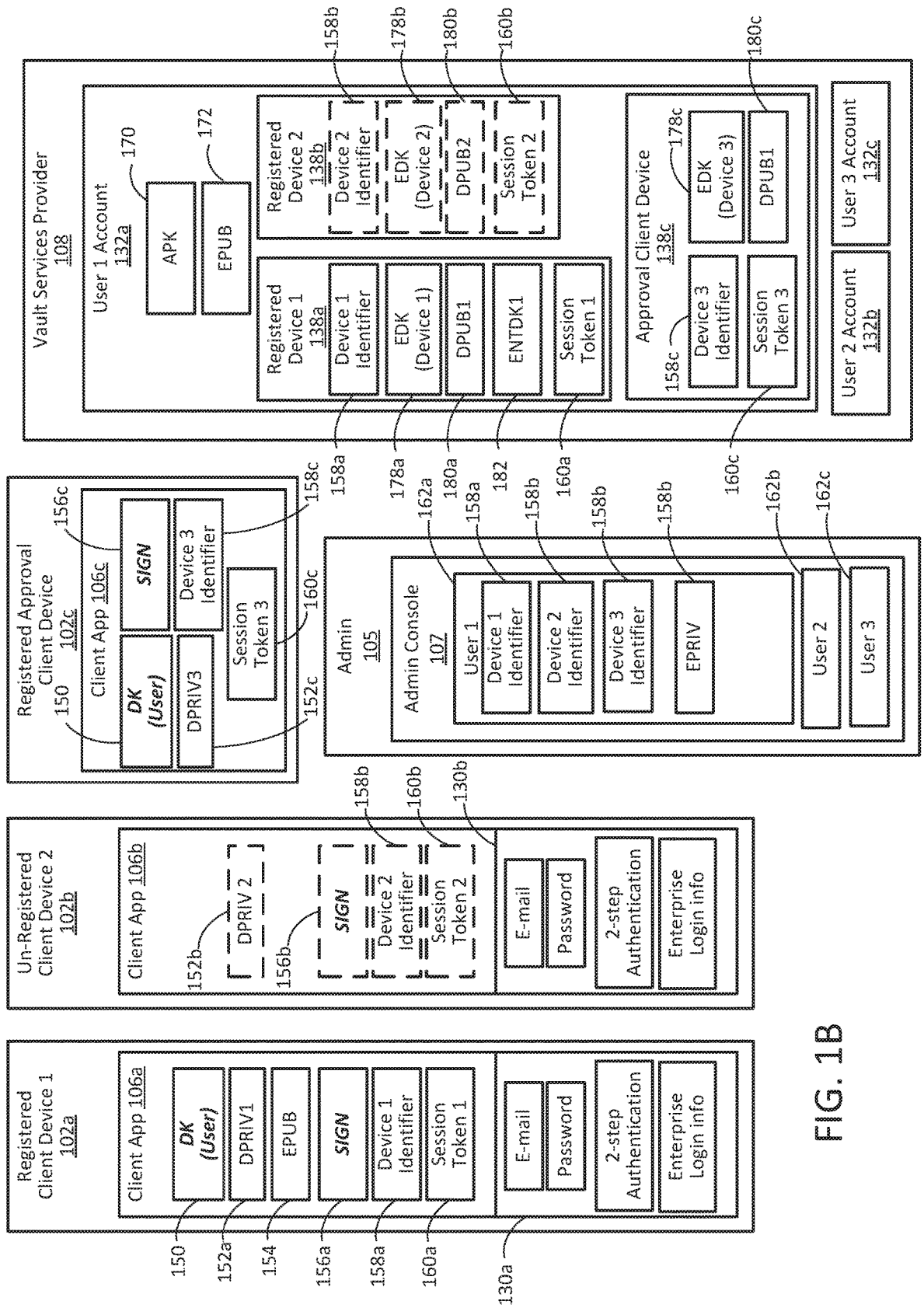
FIG. 1B is a block diagram of an example implementation of a system for authenticating a user and decrypting store data in a zero-knowledge architecture in a single sign-on environment.

FIG. 1A is a schematic block diagram of a system 100 in which client devices use SSO authentication to access resources on the Internet. FIG. 1B is a block diagram of an example implementation of the system 100 illustrating data elements in each component of the system 100 for implementing an example secure SSO authentication system in a zero-knowledge environment. Referring to FIGS. 1A and 1B, the system 100 includes a first client device 102a, a second unregistered client device 102b, an approval client device 102c, a web-based client application 103, an identity provider 104, an administrator system or console (admin) 105, and a vault service provider 108 having an associated cloud backend 112. The cloud backend 112 includes storage for a digital vault 118. The digital vault 118 may be used to store, for example, sensitive data belonging to users having a user account in the secure SSO system.

The client devices 102a,b,c may be devices that are used by the user to access internet resources. Users may have a smartphone, a tablet, a laptop, a desktop, a smart watch, and/or other similar devices that are able to access the Internet. In this description, the client device 102 may include a browser on a computing device. The first client device 102a may be registered (as discussed below with reference to FIGS. 2-8) and associated with the user. The client devices 102 are registered before they can be used in the environment 100 in FIG. 1. An unregistered client device 102b may be one that is associated with the user, but not yet identified in the SSO authentication infrastructure as a user and client device. A client device may be deemed registered when the client device has been configured to decrypt a DK using resources provided by the vault service provider 108 with the authorization of the user. When the DK has been decrypted on the client device 102a, the DK may be used to decrypt sensitive data stored locally, decrypt data received from the user's vault 140 via the vault service provider 108, and encrypt data to be sent to the vault 140 via the vault service provider 108.

In example implementations, the user installs a client application 106a,b,c on the client device 102a,b,c to initiate the process of registering the client device 102a,b,c. The client application 106 provides a user interface for logging into the user's Internet resources and for configuring an SSO account with a vault service provider account to login with a secure single sign-on. In an example implementation, the client application 106 may provide different ways to achieve the single sign-on. The user can invoke the client application 106a on the registered client device 106a to access a login screen that serves as the user's single sign-on interface for all of the user's associated applications. The user may also attempt to login directly to one of the user's associated resources and get redirected to the client application 106 login screen. In example implementations, the client device 102a that is registered first by the user may allow for other devices to be registered. Registering unregistered client devices 102b involves using a registered client device as an approval client device 102c.

The use of the approval client device is illustrated in more detail below with reference to FIGS. 4A and 8. An approval client device 102c may be any client device that the user of the client device designates as usable for approving the registration of other client devices 102b. The approval client device 102c may be the first client device registered for use by the user, or for whatever reason, a client device preferred for approving other client devices. In example implementations involving enterprise networks, the approval mechanism may be the admin as described below with reference to FIG. 4B.

The identity provider 104 (FIG. 1A) may be configured for use by a plurality of users that use the environment 100 as an organization or enterprise. As such, the identity provider 104 may be configured to include account information for each user designated by the enterprise through an administrator. The administrator, using his client device 102, may login using enterprise login credentials to perform management functions for any of the users in the enterprise.

The identity provider 104 may be configured to include a user profile. In an enterprise, the administrator may create a user profile for each user in the enterprise. Each user may then login to the identity provider 104 to register the users' client devices. Alternatively, an administrator may be responsible for registering the users' client devices.

The vault service provider 108 may include user profiles or accounts created for each user. The user profile or account may include device identifiers of client devices that the user may have registered. The user's account may also include authentication information, or IdP login information 130, which may include a username, a password, any 2-step authentication used by the IdP to confirm the user's identity, and/or any other login information required by an admin in an enterprise network. The registered client device may also include either a data decryption key for decrypting the EDK or the EDK itself to be decrypted on the client device using a data decryption key retrieved from the vault service provider 108. Each user and the user's registered client devices may be provided with a digital vault 118 for storing encrypted data records associated with each client device as used by that user. Such encrypted data records may include for example, usernames and passwords for the user's access to corresponding services by that client device. The vault 118 for each user and each user's client devices may be accessed via the cloud backend of the vault service provider 108.

FIG. 1B depicts one example implementation of the secure SSO system 100 in FIG. 1A. At least one other example implementation is described through description of alternatives in the details described. It is to be understood however that the description of examples herein is not intended to be limiting. Alternative implementations to those described herein may be used within the scope of the appended claims. The block diagram in FIG. 1B depicts an environment of the secure SSO system 100 in FIG. 1A in which a first user (User 1) uses a first registered client device 102a, an unregistered client device 102b, and an approval client device 102c. The first registered client device 102a is the device used by the user to configure the secure SSO resources for the user. After registration of the first registered client device 1 102a, but before attempting to register the unregistered client device 2 102b, the user is presumed to have registered the approval client device 102c.

The environment illustrated in FIG. 1B also illustrates operation of the secure SSO system 100 where User 1 uses resources on the Internet 110 in an enterprise network. Such an enterprise network may involve an enterprise network infrastructure where each user may typically, but not exclusively, operate their devices within a network that is securely separate from the rest of the Internet, such as, for example, a local area network, a virtual private network, etc. The enterprise network and use of Internet resources may be managed by a single administrative entity, or an admin 105. The admin 105 may interface with the enterprise network by an admin console 107, which may include the hardware and software that allows the admin to maintain, monitor, and configure the user accounts for the users and the devices they use.

As shown in FIG. 1B, the registered client device 102a may include security data that allows the user to access the IdP 104 and the vault service provider 108. The security data may include, for example, the DK 150, the DPRIV1 key 152a, an EPUB key 154, a SIGNED ATTESTATION 156a, a device identifier 158a, and a session token 160a. In an alternative implementation, the EDK is also securely stored in the registered client device 102a and the SSOK key is retrieved to decrypt the EDK within the registered client device 102a. This alternative implementation is described further below.

The registered client device 102a in FIG. 1B is the first client device registered by the user with the vault service provider 108. The registered client device 102a therefore stores the EPUB key 154 of the enterprise key pair generated by the admin 105 upon installation of the client app 106a. The registered client device 102a also stores the DPRIV1 key 152a from the device key pair that includes the DPUB1 key 180a. The DPUB1 key 180a corresponds to the registered client device 102a and is stored in a registered device 1 data storage 138a. The registered client device 102a stores a session 1 token 160a and a device identifier 1 158a received from the vault service provider 108 during the registration process. The session token 1 160a is used by the registered client device 102a in communications between the registered client device 102a and the vault service provider 108. The device identifier 1 158a is used to identify the client device 102a as a valid device for the user. The device identifier 1 158a may be stored in the vault service provider 108 and/or the client device 102a local storage.

The registered client device 102a in FIG. 1B receives an EDK1 178a stored in the vault service provider 108 when the user logs in to the vault service provider 108 (e.g. in the process of logging in to an associated resource), and decrypts the EDK1 178a using the DPRIV1 key 152a stored in the client device 102a. Decryption of the EDK1 178a generates the DK 150 for the user. The DK 150 is then available to decrypt and encrypt data while the user has access to the selected resource. The DK 150 is not maintained in the registered client device 102a permanently. Once the user shuts down a session in which the DK 150 is used, the DK 150 may be deleted. A signed attestation 156a may also be temporarily provided by the IdP 104 during a login to the IdP 104. The signed attestation key 156a is received during login and provided to the vault security provider 108 to use for confirmation of the user's identity to begin a session. The signed attestation key 156a may be maintained in local storage on the registered client device 102a or deleted once the user's identity is confirmed by the IdP 104 and the vault service provider 108.

The vault service provider 108 stores information about the user in a user account data storage. The example in FIG. 1B illustrates storage for three users, a user 1 account 132a, a user 2 account 132b, and a user 3 account 132c to clarify the way data may be structured in an example secure SSO system. The example in FIG. 1B also illustrates information to be stored for the three client devices used by user 1 in a registered device 1 data storage 138a, an unregistered device 2 data storage 138b, and an approval device data storage 138c. The user 1 account 132a may store sensitive data for user 1, including, for example, the APK 170 received from the user in configuring SSO with the IdP 104. The vault service provider 108 receives the signed attestation 152a from the registered client device 102a during confirmation of identity and validates the signed attestation 152a with the APK 170 stored in the registered device 1 data storage 138a.

The user 1 account may also store an EPUB key 172 for implementations in which the user's secure SSO account is managed via an enterprise network administrator. The EPUB key 172 may also be stored in data storage for the registered client device that is first to be registered for the user. In another implementation, the EPUB key 172 may be stored in data storage for each registered client device (e.g. 138a and 138b) belonging to the user to allow for a situation in which the first registered client device 102a is subsequently removed.

The registered client device 102a is registered for use by the user and the vault service provider 108 organizes the user's data according to client device. In the illustrated example, the user's data for the first client device 102a may be stored in the vault service provider 108 in the registered device 1 data storage 138a. The secure data shown stored in the registered device 1 data storage 138a includes an EDK generated using the DPUB1 key 180a to encrypt the DK 150 belonging to the user. In an example implementation, the actual DK is not stored in the vault service provider 108. The client device 102a generates an EDK 178a using the DPUB1 key 180a and sends to the vault service provider 108 to store in the registered device 1 storage 138a. The DPUB1 key 180a is also sent to the vault service provider 108 and stored in the registered device 1 storage 138a.

Because the registered client device 102a is the first device registered for the user, the registered device 1 storage 138a may also store an enterprise encrypted data key (ENTDK1) where the user operates in an enterprise network. The ENTDK key 182 is generated by the first registered client device 102a during the process of registering the device using: ENTDK1={DK}_EPUB. The client device 102a sends the ENTDK1 key to the vault service provider 108 for storage. In an example implementation, the vault service provider 108 may also generate a session token 1 160a during registration for the registered client device 102a to use in communications between the registered client device 102a and the vault service provider 108. The session token 1 160a is stored in the local storage of the registered client device 102a as well.

FIG. 1B illustrates unregistered client device 102b becoming registered. The unregistered client device 102b has an installed client app 106b and in the first operation of the client app 106b, the process of registering the unregistered client device 102b is begun by generating the device key pair, storing the DPRIV2 key in local storage on the client device 102b, sending the DPUB2 key to the vault service provider 108, and receiving a unique device identifier 2 158b.

The process may then be carried through to the IdP 104 and the vault service provider 108 by attempting to login to the IdP 104. The attempt to login to the IdP 104 may be initiated by connecting to the IdP 104 using a Universal Resource Locator (URL) for the IdP 104. The IdP 104 may be invoked on a browser web page or by executing an instruction to connect via the URL in the client app 106b. The connection to the IdP 104 through the URL of the IdP 104 may generate a login window having prompts to enter a username and password. The user may also be redirected to login to the IdP 104 by attempting to access an associated resource to which the user has not logged in. The SSO scheme provided by the IdP 104 redirects the user to the login page of the IdP 104. The unregistered client device 2 102b obtains information for security and SSO implementation as the process of registration continues as described below with reference to FIGS. 4A, 4B, and 7.

It is noted that the registered client 1 device 102a and/or the unregistered client device 2 102b may be a browser executing on a computing device and the client app 106a or b may be browser-based client application 106c. A browser-based client app 106c operates as a new device to be registered when the page opens. It operates by obtaining its own device key pair (DPUB and DPRIV) and unique device identifier to generate its own EDK.

The approval client device 102c may be a previously registered device for use by the user that may be included as an option for approving an unregistered client device (e.g. 102b) for use by the user in the secure SSO system 100. The approval client device 102c may need to be logged in to the IdP 104 and the vault service provider 108 to operate as an approval mechanism as described below. The approval client device 102c as a registered device stores in its local storage the same or similar data described above for the registered client device 1 102a such as for example, a DPRIV3 152c, the signed attestation 156c, a device 3 identifier 158c, and a session token 160c. The DK 150 may be stored in the approval client device 102c while in a session with the vault service provider 108, but otherwise does not permanently store the DK key.

The admin 105 includes an admin console 107, which includes hardware and software for managing user accounts for users in the enterprises. The admin console 107 may also manage registration and maintenance of the client devices used by the user. The admin console 107 may operate as a client device during approval of a new client device. The admin 105 may be a tool provided by the vault service provider in an example implementation.

The admin console 107 may maintain storage of information about the user and the user's client devices. For example, for user 1 162a, the admin console 107 may store the device 1 identifier 158a, the device 2 identifier 158b, and the device 3 identifier 158c. The admin console 107 may also include the EPRIV key 164 in storage corresponding to the user 1 162a for use when a new device is seeking approval to register. In one example implementation, the admin console 107 may perform a pre-approval of a plurality of devices used by the user when registering the first client device 102a. When the first registered client device 102a logs in for the first time, after the identity of the user is confirmed, the vault service provider 108 may request that the user's devices send user account and device information to the admin console 107. The admin console 107 may then approve or disapprove each device based on any requirements the admin 105 deems fit. For example, the admin 105 may limit registration to devices of certain device type, OS, OS version, MDM settings, etc.).

FIGS. 2-5 are message flow diagrams illustrating a first example implementation of a first example of a secure SSO authentication system. FIGS. 2-5 illustrate the use of the secure SSO system, creation of a vault service provider account for a first client device, registration of a subsequent client device, and removal of a client device from the user's list of registered client devices. The example illustrated in FIGS. 2-5 stores an EDK for a client device used by a user in the vault service provider 108, the EDK is encrypted using a public key stored in the vault service provider 108, and decrypted on the client device using the private key stored in the client device in the key pair with the public key that encrypted the EDK key. Zero knowledge is maintained because the vault service provider cannot decrypt the EDK key to access the DK key. The DK key is not stored in permanent storage anywhere and only decrypted upon confirmation of the identity of the user for which the client device is registered. It is noted that the description of example implementations with reference to FIGS. 2-5 is not intended as limiting the scope of any of the claimed subject matter.

Figure 6:
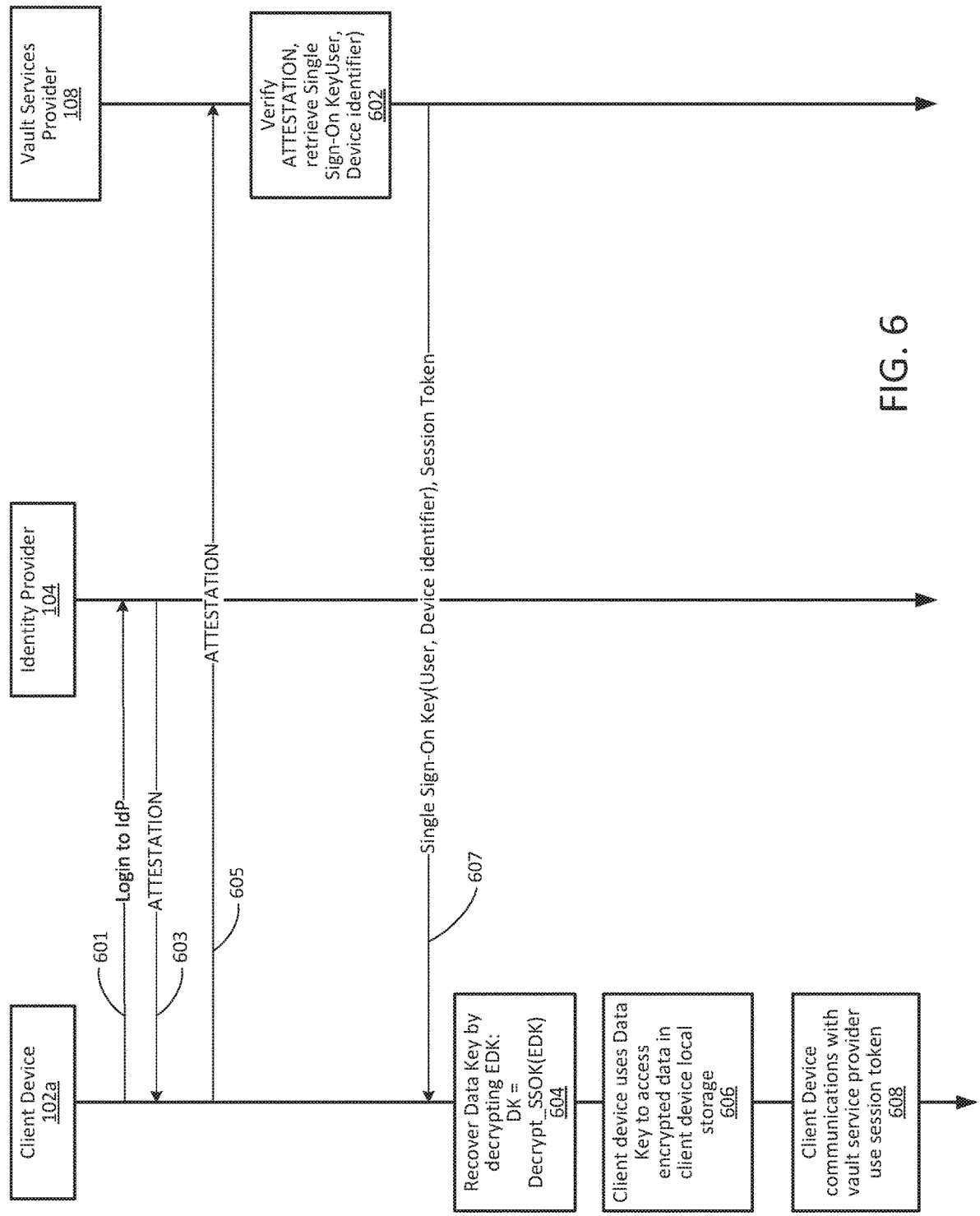
FIG. 6 is a message flow diagram illustrating operation of another example method for accessing secure data using single sign-on authentication and access to a digital vault in a zero-knowledge environment.
Figure 7:
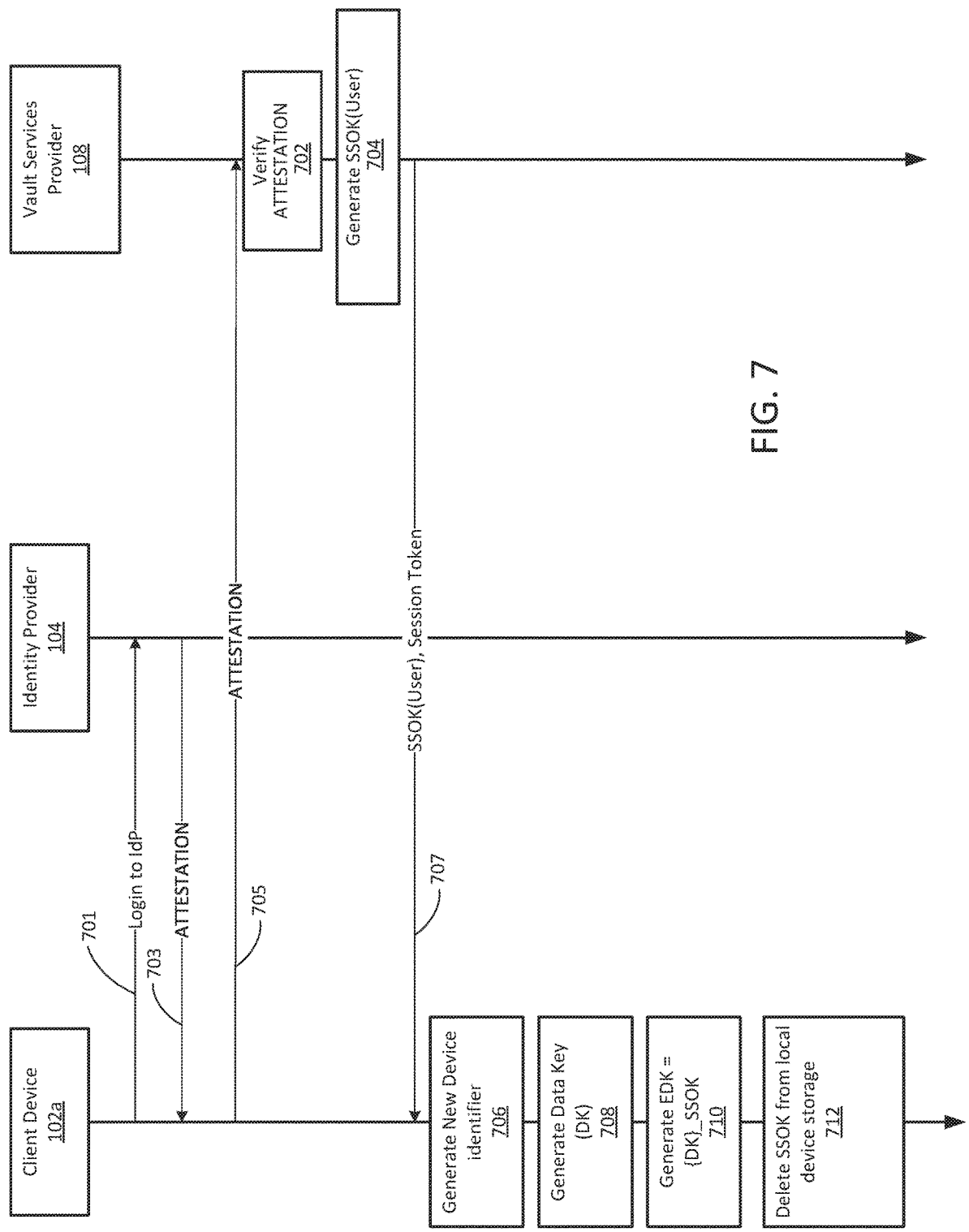
FIG. 7 is a message flow diagram illustrating operation of another example method for registering a first client device to enable access to secure data using the method in FIG. 6.
Figure 8:
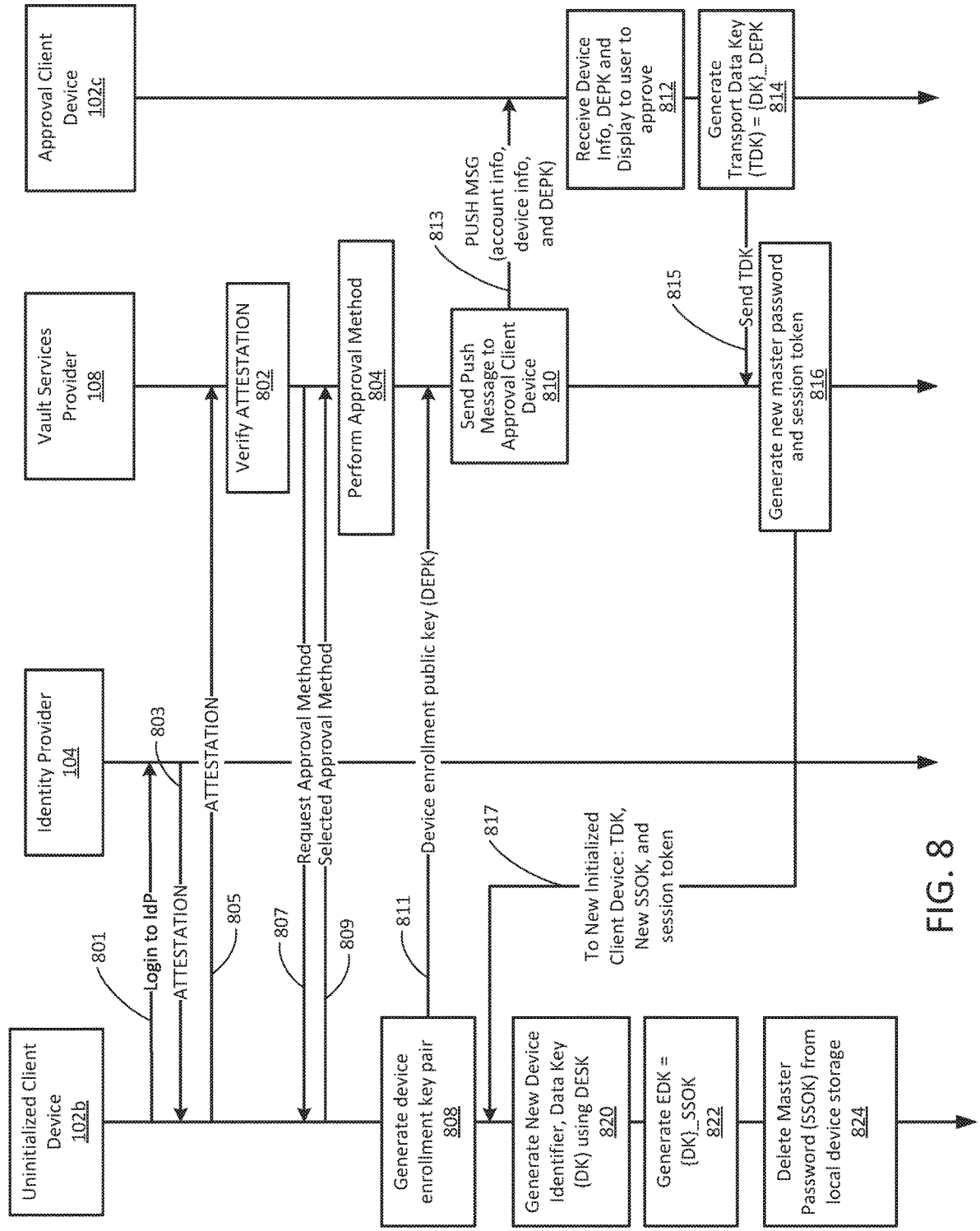
FIG. 8 is a message flow diagram illustrating operation of another example method for registering another client device after registering at least a first client device to enable access to secure data using the method in FIG. 6.

FIGS. 6-8 are message flow diagrams illustrating a second example implementation of a secure SSO authentication system. FIGS. 6-8 illustrate the use of the secure SSO system, creation of a vault service provider account for a first client device, registration of a subsequent client device, and removal of a client device from the user's list of registered client devices. The example illustrated in FIGS. 6-8 stores an EDK for a client device used by a user in the registered client device 102*a*, the EDK is encrypted using a symmetric key stored in the vault service provider 108 and decrypted on the client device using the symmetric key received by the client device during authentication. Zero knowledge is maintained because the vault service provider cannot decrypt the EDK key to access the DK key. The DK key is not stored in permanent storage anywhere and only decrypted upon confirmation of the identity of the user for which the client device is registered. It is noted that the description of example implementations with reference to FIGS. 6-8 is not intended as limiting the scope of any of the claimed subject matter.

With respect to the example implementations described with reference to FIGS. 2-5, FIG. 2 is a message flow diagram illustrating operation of an example method for accessing secure data using secure SSO authentication involving access to a digital vault in a zero-knowledge environment. In the example in FIG. 2, the client device 102*a* is registered and is being used by the user to perform a SSO authentication to access the vault service provider 108. Once the user accesses the vault service provider 108, the user may access associated resources, which are resources to which the SSO authentication allows the user to access. Associating resources may be performed via the IdP 104.

The client device 102*a* performs an SSO authentication by logging in to the IdP 104 at 203. The client device 102*a* may connect directly to the IdP 104 to log in or may be redirected to the IdP 104 from an attempt to access the vault service provider 108, or another associated resource. When the IdP 104 confirms the user's identity, the IdP 104 sends a signed attestation to the client device 102*a* to indicate confirmation of the user's identity to associated resources. The client device 102*a* sends the signed attestation at 207 and a stored device identifier that is unique to the client device 102*a* to the vault service provider 108 to enable access to secure data stored for the user when the user uses the client device 102*a*. The vault service provider 108 validates the signed attestation using the APK stored in the vault service provider 108 for the user to confirm the user's identity at 202. If the user's identity is confirmed, and the vault service provider 108 confirms that the client device 102*a* identified by the device identifier belongs to the user and is registered, the vault service provider retrieves the EDK for the user and device identifier at 204.

The vault service provider 108 sends the EDK for the user and client device 102*a* to the client device 102*a* at 209. In an example implementation, the vault service provider 108 may generate a session token and send the session token to the client device 102*a* to be used in communications between the client device 102*a* and the vault service provider 108. The client device 102*a* receives the EDK key and device identifier and generates the DK key using the DPRIV key stored in the client device 102*a* to decrypt the EDK key according to: DK=Decrypt_DPRIV(EDK) at 208.

Once the client device 102*a* has decrypted the EDK key to generate the DK key, the client device 102*a* decrypts data in communications from the vault service provider 108 and encrypts data for communications to the vault service provider 108 using the DK key as noted at 210. In an example implementation, the client device can implement a client key to encrypt and decrypt locally stored data. The DK key may be used encrypt and decrypt the client key to further protect the user's data if the DK key is stolen. A brute force attack is prevented if the DK key is stolen. At 214, the client device 102*a* may use a session token provided by the vault service provider to communicate messages between the client device 102*a* and the vault service provider 108.

Figure 2:
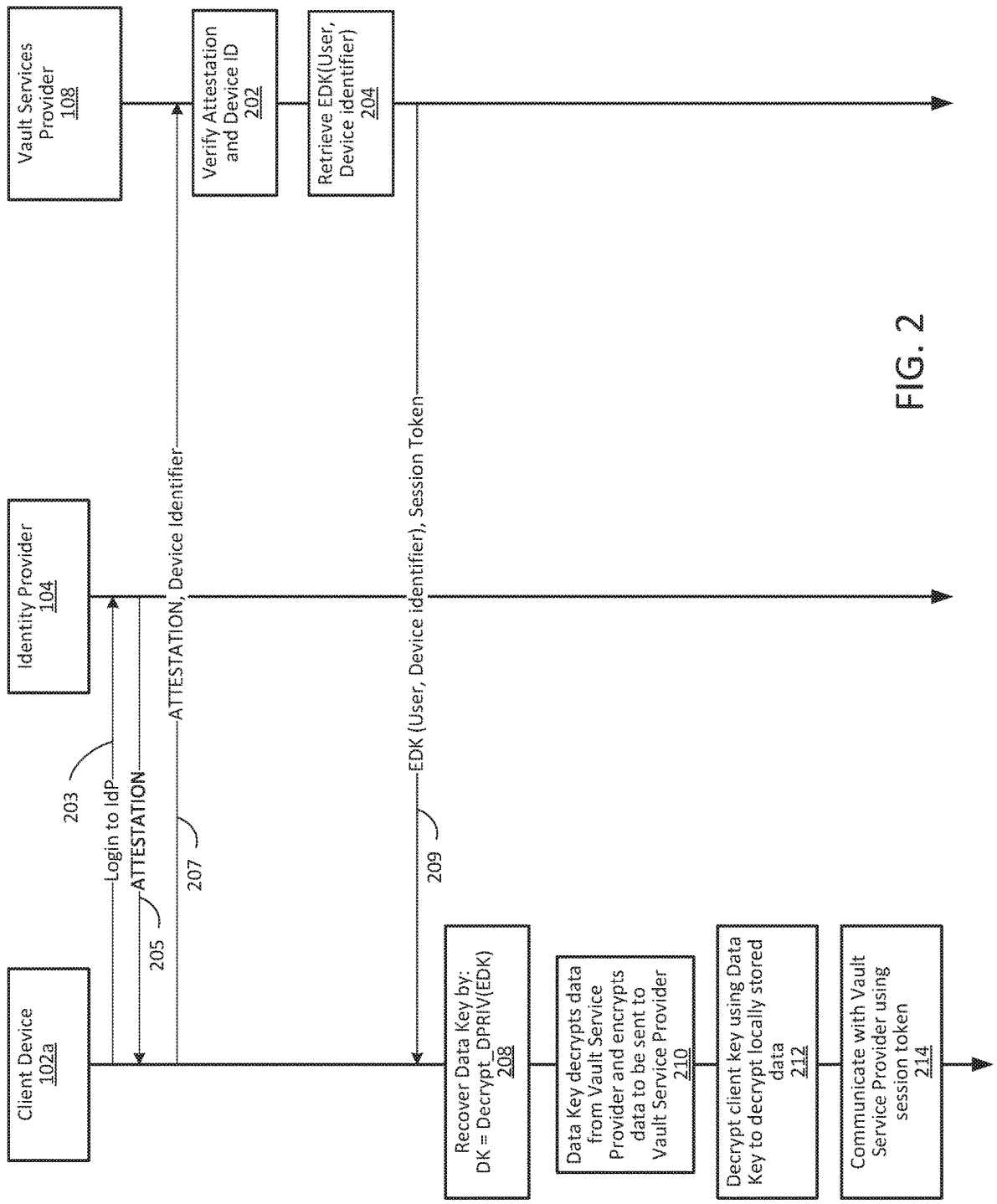
FIG. 2 is a message flow diagram illustrating operation of an example method for accessing secure data using single sign-on authentication and access to a digital vault in a zero-knowledge environment.
Figure 3:
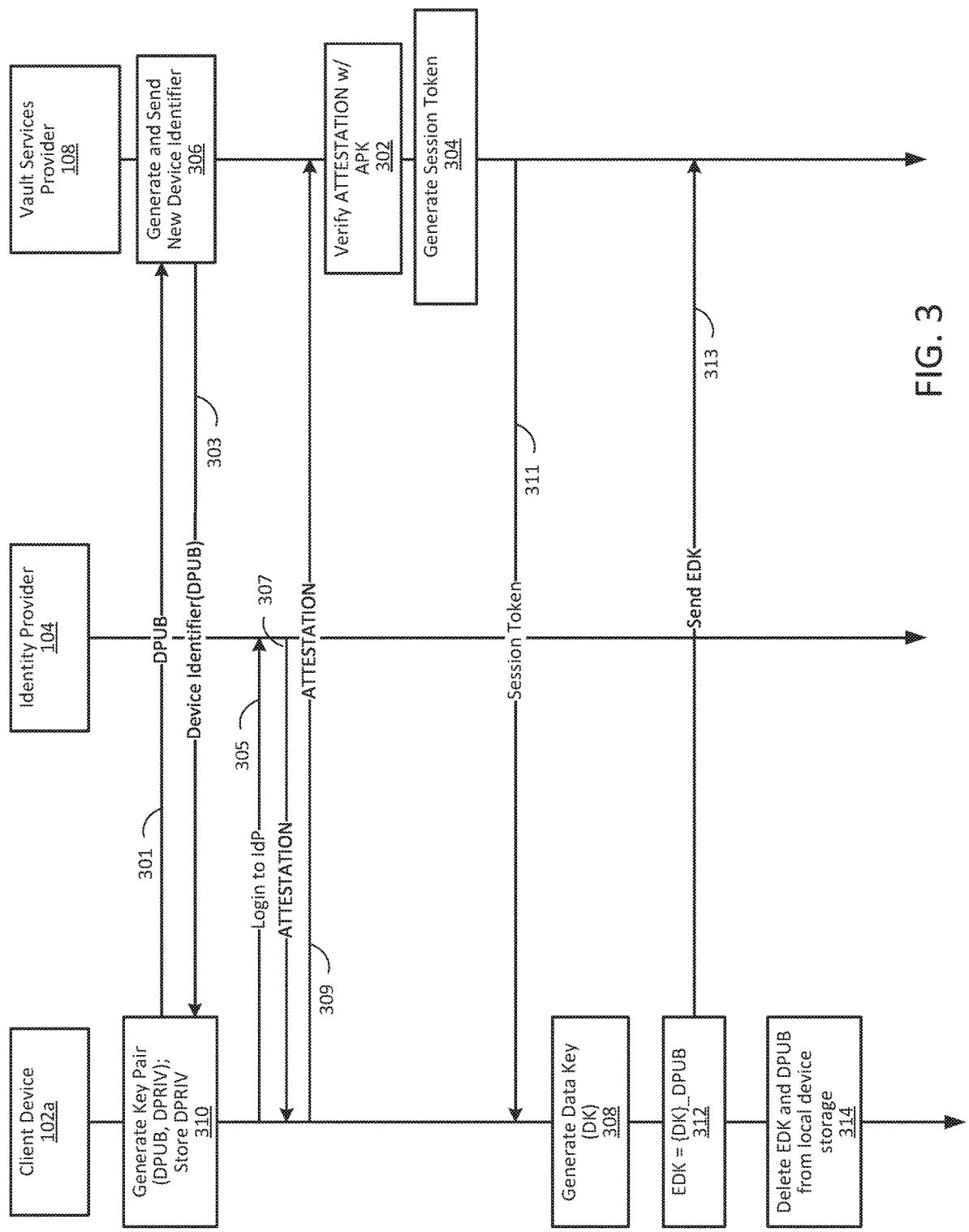
FIG. 3 is a message flow diagram illustrating operation of an example method for registering a first client device to enable access to secure data using the method in FIG. 2.

FIG. 3 is a message flow diagram illustrating operation of an example method for registering a first client device to enable access to secure data using the method in FIG. 2. The example method illustrated by FIG. 3 may be used when the user first creates accounts with the identity provider 104 and/or the vault service provider 108 and is registering the first client device for use with the secure SSO system.

The user begins the process of registering a first client device by installing the client app 106*a* on the first client device 102*a*. Once installed, or during installation, the client device 102*a* generates a device key pair comprising the DPUB key and the DPRIV key at step 310. The client device 102*a* sends the DPUB key to the vault service provider with an indication that a new device and maybe a new user is attempting to create an account and register a device with the account. The vault service provider 108 receives the DPUB key and begins the process of registering the device 102*a*. At step 306, the vault service provider 108 generates a unique device identifier and sends the new device identifier to the client device 102*a* at message 303. The device identifier is sent to the client device at 303 with a reference to the DPUB key sent to the vault service provider 108. The vault service provider 108 also may create a user account for the user and a device profile for the client device 102*a* as described with reference to FIG. 1B.

The client device 102*a* receives the device identifier and creates a profile for the user and client device for authentication with the vault service provider 108. The creation of the user and client profile may involve creating data storage structures as described above with reference to FIG. 1B. The client device 102*a* may attempt to login to the IdP 104 to complete registration of the client device 102*a* at 305. The IdP 104 performs authentication as described above with reference to FIGS. 1A and 1B and if the identity of the user is confirmed, the IdP 104 sends a signed attestation for the user to the client device 102*a* at 307. The client device 102*a* sends the signed attestation to the vault service provider 108 at 309. The vault service provider validates the signed attestation using a previously received APK for the user at step 302. The vault service provider 108 may also generate a session token and send the session token to the client device 102*a* at message 311.

The vault service provider 108 may receive acknowledgment from the vault service provider 108 that the user's identity is confirmed. At step 308, the client device 102*a* generates the DK key for the user. The DK key is generated by the first client device 102*a* used by the user for the user. The same DK key is then used by other registered client devices corresponding to the user. The client device 102*a* encrypts the DK key at step 312 using EDK=DPUB to permit subsequent decryption using the DPRIV key, the other key in the device key pair. At step 314, the client device 102A deletes the EDK and the DPUB from storage with the client device 102*a* now deemed registered and able to retrieve the EDK by authenticating with the IdP 104 and the vault service provider 108 as described above with reference to FIG. 2.

Figure 4A:
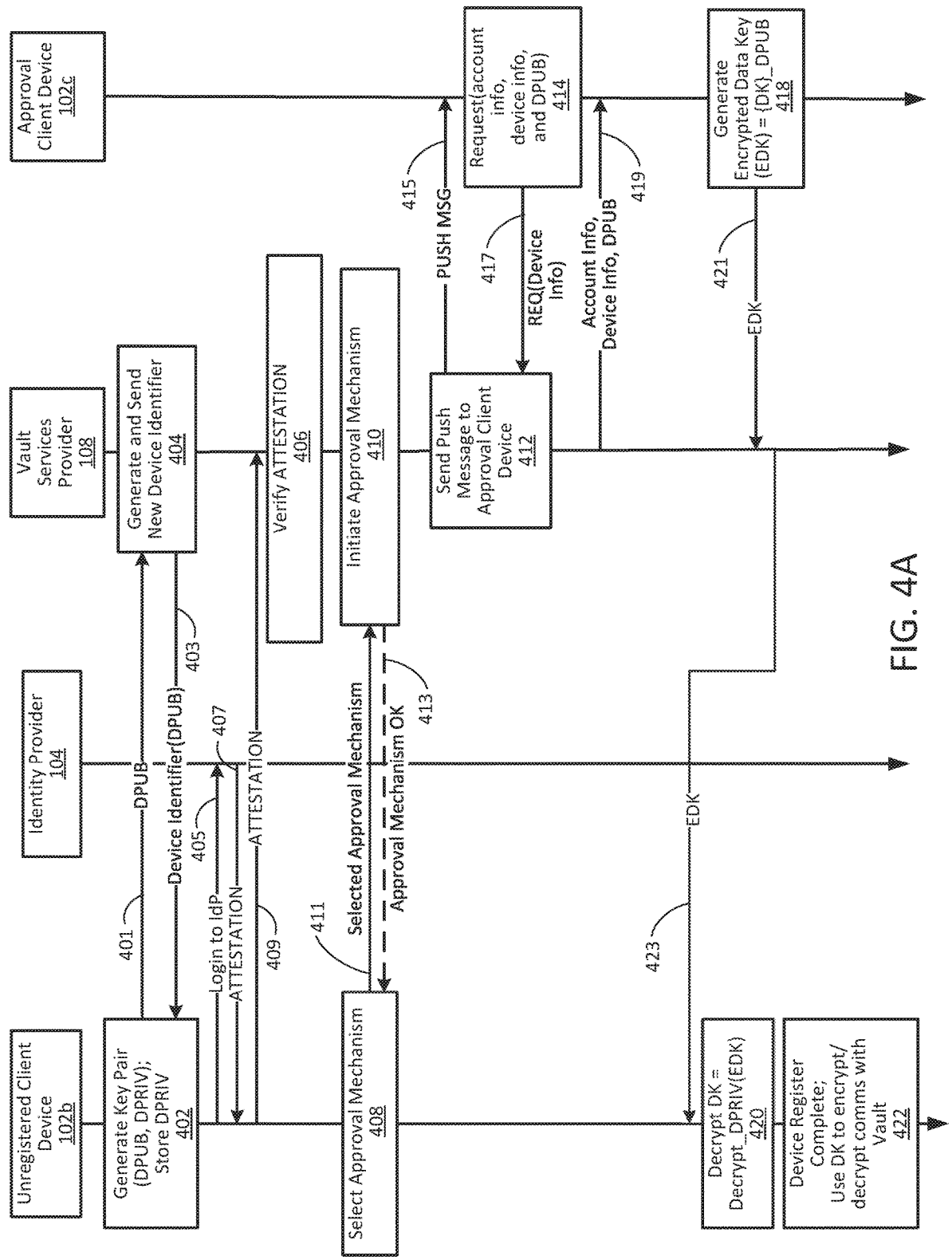
FIG. 4A is a message flow diagram illustrating operation of an example method for registering another client device after registering at least a first client device to enable access to secure data using the method in FIG. 2 using another registered client device as an approval mechanism.

FIG. 4A is a message flow diagram illustrating operation of an example method for registering another client device after registering at least a first client device to enable access to secure data using the method in FIG. 2 using another registered client device as an approval mechanism. The example in FIG. 4A may illustrate a process for registering another client device for the user to log into associated resources using secure SSO authentication. For example, the user may have used a smartphone as a first registered device 102a to use the secure SSO system, then added a laptop computer as another device to use the secure SSO system. In the example shown in FIG. 4A, the other device (e.g. laptop computer) 102c functions as an approval mechanism 102c for registering the unregistered client device 102b.

The registration of a new unregistered client device 102b includes obtaining a device key pair (DPUB and DPRIV) from the vault service provider 108 at step 402 pursuant to installing the client application 106b (FIGS. 1A and 1B) on unregistered client device 102b in a manner similar to that described above for the client device 102a.

The client device 102b sends the DPUB to the vault service provider 108 at message 401. The client device 102b may provide an indication that the user is attempting to register a new device. The vault service provider 108 receives the DPUB key and generates a new device identifier 404 at step 404. The vault service provider 108 may also create a secure data storage for secure data related to the use of the unregistered client device 102b for the user. The data storage created may be similar to the unregistered client device storage 138b shown in FIG. 1B. The vault service provider 108 then sends the new device identifier for the DPUB key to the client device 102b at message 403.

The client device 102b may create secure data storage for the secure SSO account similar to that described in FIG. 1B. The user may complete registration by logging in to the IdP 104 from the client device 102b at message 405. If the user authenticates on the IdP 104, the IdP 104 sends the signed attestation for the user to the client device 102b at message 407. The user at client device 102b sends the signed attestation to the vault service provider 108 to complete authentication for access to the user's vault in the vault service provider 108 at message 409. Message 409 may also include the device identifier for the unregistered client device 102b. At step 406, the vault service provider 108 validates the signed attestation using the user's APK. The vault service provider 108 may send an acknowledgement of confirmation of identity to the client device 102b. The client device 102b performs a process for selecting an approval mechanism at step 408. The process for selecting an approval mechanism my involve displaying a list of possible approval mechanisms to the user on the client device 102b. The list may include selected (or all) of the user's already registered client devices. The list may also include the admin to use in a manner described below with reference to FIG. 4B. The list may also be, or include, a default approval mechanism that may be a preselected registered client device, or a default to selection by the vault service provider 108. The client device 102b may send the user's selected approval mechanism on message 411 to the vault service provider 108. The vault service provider 108 initiates the approval process for approving the unregistered client device 102b at step 410. The vault service provider 108 may acknowledge selection of the approval mechanism at message 413.

The vault service provider 108 sends a push message 415 at step 412 to the selected approval mechanism, which is the approval client device 102c in the illustrated example. The push message 415 may be received at the approval client device 102c. The approval client device 102c may display a prompt for the user to approve or disapprove of the use of the client device 102c as the approval mechanism. Alternatively, the approval client device 102c may be previously designated to be the approval mechanism. In addition, in some implementations, the approval client device 102c may need to be logged into the vault service provider 108 as the user in order to perform approval of another device. If the user is not logged in via the approval client device 102c, the vault service provider 108 may wait for the user to log in. Once the user is logged into the vault service provider 108 on the approval client device 102c, the approval client device 102c is provided access to the DK key corresponding to the user.

At step 414, the approval client device 102c the approval client device 102c may request user account information, device information and the DPUB key from the vault service provider 108. The user account information may include information that allows the approval client device 102c to confirm the user's identity. The device information may include the device identifier for the approval client device 102c and other information that may allow the approval mechanism to validate the device for operation on the secure SSO system. For example, the device information may include details about the unregistered client device 102b such as the operating system used, the type of device and other information that may relate to restrictions on the type of client device that may be used. The approval client device 102c sends the request for information at message 417. The vault service provider 108 ma send the requested information at message 419. At step 418, the approval client device 102c may generate an EDK associated with the unregistered client device 102c using: EDK={DK} DPUB, where the DPUB key is the DPUB key corresponding to the unregistered client device 102b. The approval client device 102c sends the EDK and DPUB key to the vault service provider 102c at message 421. The vault service provider 108 sends the EDK to the now registered client device 102b at message 423. The client device 102b receives the EDK and decrypts the EDK at step 420 according to: DK=Decrypt_DPRIV (EDK), where DPRIV key is the private key in the device key pair corresponding to the client device 102b. At step 422, the registration of client device 102b is complete. The DK is used to encrypt/decrypt data exchanged between the client device 102b and the vault service provider 108. In addition, future logins by the user on the client device 102b may proceed in a manner similar to that described for client device 102a in FIG. 2.

Figure 4B:
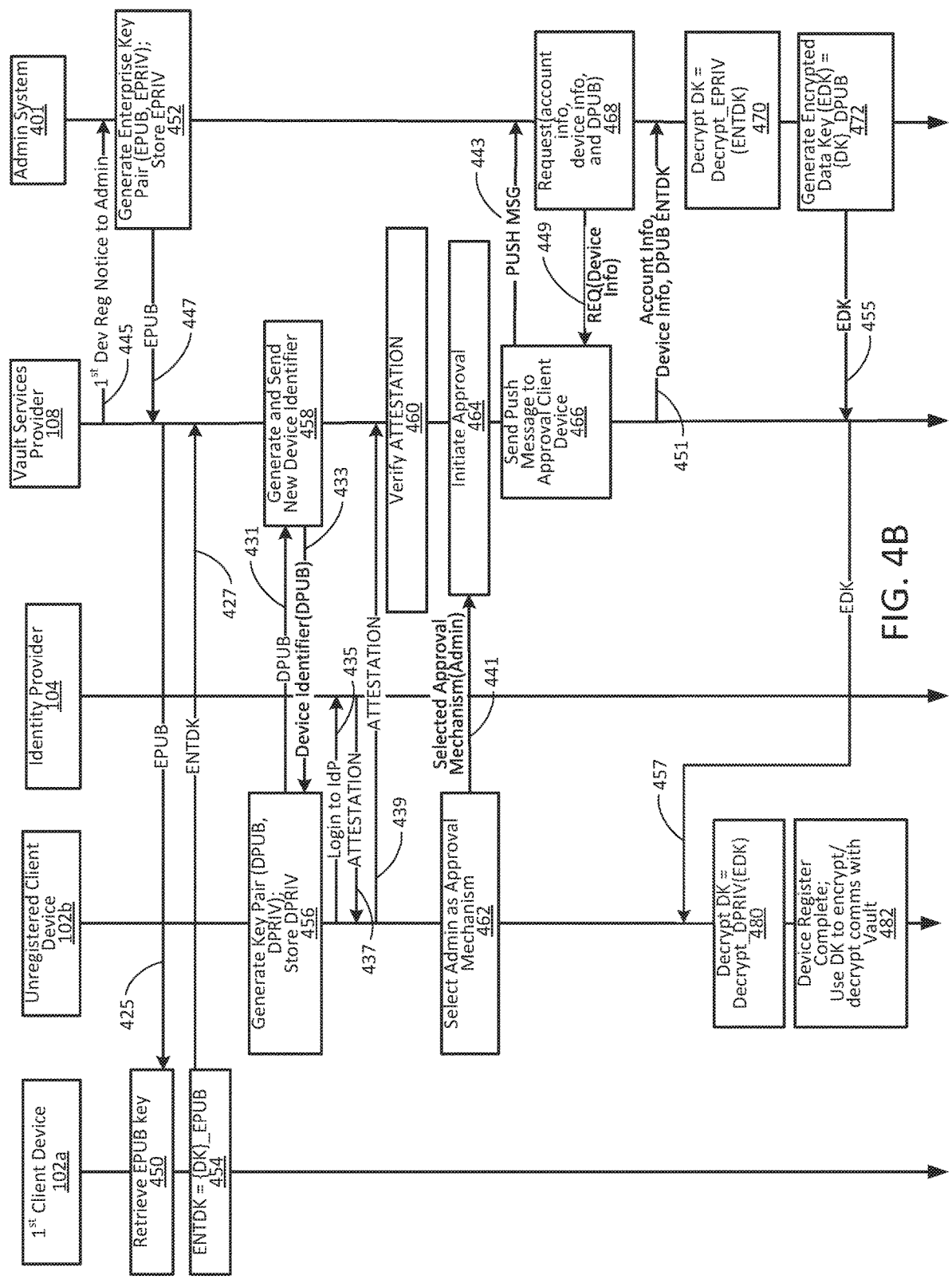
FIG. 4B is a message flow diagram illustrating operation of an example method for registering another client device after registering at least a first client device to enable access to secure data using the method in FIG. 2 using an admin as an approval mechanism.

FIG. 4B is a message flow diagram illustrating operation of an example method for registering another client device after registering at least a first client device to enable access to secure data using the method in FIG. 2 using an admin as an approval mechanism. In an example implementation, the process illustrated in FIG. 4B may be performed in the context of an enterprise network. The vault service provider 108 may provide infrastructure that includes an admin system 401 to manage access to the secure SSO system by the users in the enterprise and the devices they use.

In the example illustrated in FIG. 4B, the vault service provider 108 may send a request to the admin system 401 regarding registration of the first client device 102a at message 445. The admin system 401 may generate the enterprise key pair (EPUB, EPRIV) at step 452 during registration of the first registered client device 102a and send the EPUB key at message 447 to the vault service provider 108. The admin system 401 maintains the EPRIV key in local storage on the admin console. The vault service provider 108 sends the EPUB key at message 425 to the first client device 102a. The first client device 102a receives the EPUB key at 450 and uses the EPUB key at step 454 to encrypt the DK corresponding to the user available to the registered client device 102a while the user is logged in at the client device 102a. The enterprise encrypted data is ENTDK={DK}_EPUB. The first client device 102a sends the ENTDK to the vault service provider 108 at message 427.

The unregistered client device 102b may begin a process of registering with the user by installing a client app 106b (FIG. 1B) and generating a device key pair (DPUB and DPRIV) at step 456. The unregistered client device 102b sends the DPUB key to the vault service provider 108 at message 431. The vault service provider 108 generates a new device identifier for the unregistered client device 102b at step 458. The vault service provider 108 sends the device identifier corresponding to the DPUB key to the client device 102b at message 433.

The client device 102b may continue the process of registration by logging in to the IdP 104 at message 435. The IdP 104 sends the user's signed attestation when the user's identity is confirmed at message 437. The client device 102b may send the signed attestation and the new device identifier to the vault service provider 108 at message 439 to complete the registration of the client device 102b. The vault service provider 108 confirms the identity of the user using the APK at step 460.

The client device 102b may prompt the user to select an approval mechanism at step 462. The client device 102b may send message 441 indicating selection of the admin as the approval mechanism to the vault service provider 108. The vault service provider 108 may initiate the approval mechanism at step 464.

The vault service provider 108 may send a push message to the admin at step 466. The push message may prompt the admin to initiate approval process for approving the client device 102b. The admin may send a request at message 449 to the vault service provider 108 for account information, device information and the client device 102b DPUB key. The vault service provider 108 may provide the requested information at message 451 to the admin. The vault service provider 108 may include the ENTDK, which is the user's DK key previously encrypted using the EPUB key generated by the admin for the first client device 102a (at step 452). At step 470, the admin decrypts the ENTDK key using: Decrypt DK=Decrypt_EPRIV(ENTDK). The admin may use the DPUB key belonging to the client device 102b to encrypt the DK at step 472 using: EDK=DPUB. The admin sends the EDK to the vault service provider 108 at message 455. The admin may then delete the DK from its data store.

The vault service provider 108 receives the EDK and sends the EDK to the client device 102b at message 457. The client device decrypts the EDK at step 480 using: DK=Decrypt_DPRIV(EDK), where the DPRIV is the private key of the device key pair corresponding to the client device 102b. At step 482, the client device 102b is now registered and the DK key is used to encrypt/decrypt data communicated with the vault service provider 108.

Figure 5:
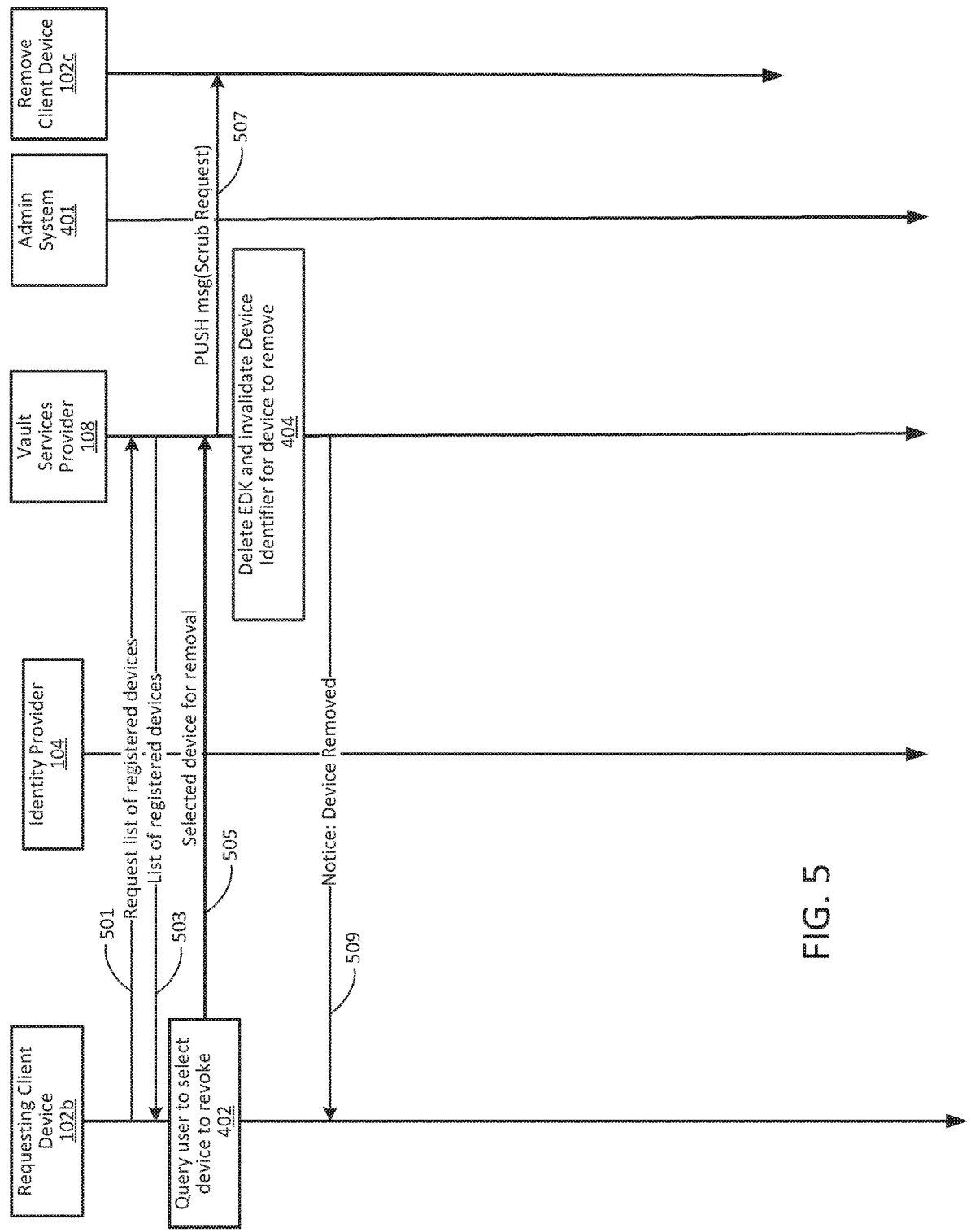
FIG. 5 is a message flow diagram illustrating operation of an example method for removing a client device from a user's client device to disable access to the secure data by the client device being removed.

The secure SSO system advantageously allows for the removal of a registered client device from the list of client devices that a user may have registered. FIG. 5 is a message flow diagram illustrating operation of an example method for removing a client device from a user's client device to disable access to the secure data by the client device being removed. The requesting client device 102b may for example, request that a registered client device 102c to be removed. The user may not know to identify the client device 102c to be removed by a device identifier or by a key pair. The user may initiate a device removal process on the client device 102b, for example, by sending a request for a list of registered devices at message 501 to the vault service provider 108. The vault service provider 108 may, for example, compile a list of text strings comprising information for identifying the registered client devices at message 503. The client device 102b may generate at step 402 a message to display to the user prompting the user to select one of the registered devices. The client device 102b may send a message 505 identifying the selected client device to the vault service provider 108. The vault service provider 108 may send a push message 507 to the client device 102c to be removed with a request to scrub the storage of the client device 102c to be removed. The vault service provider 108 may remove the client device 102c at step 404 by deleting the EDK corresponding to the client device 102c and the device identifier corresponding to the client device 102c. The vault service provider 108 may send a notice 509 to the client device 102b indicating that client device 102c has been removed.

It is noted that the example implementation of the secure SSO system described with reference to FIGS. 2-5 advantageously allows a user to use multiple IdP's since the use's EDKs are not affected by using a different IdP. As long as a signed attestation is received and accepted by the current configuration for the user, the user's EDK for a given registered device can be returned to the user to decrypt the user's vault. The user may also associate multiple usernames used to SSO authenticate with the original username created during configuration of the secure SSO system. The user may therefore login to the user's vault using multiple identity providers at the same time with multiple usernames.

FIG. 6 is a message flow diagram illustrating operation of an example method for removing a client device from a user's client device to disable access to the secure data by the client device being removed. In the message flow shown in FIG. 6, it is assumed that the user at the client device is attempting to use single sign-on to connect to an associated for which the identity provider 104 has been configured to provide access. The client device 102a sends a communication 601 to the identity provider 104 to initiate a login to the identity provider 104. In some implementations, the login communication in FIG. 6 may be redirect from a user's attempt to login directly to the vault service provider 108, or to another website. When secure SSO authentication is used to access a resource, the vault service provider 108 may provide password and key management services to ensure the user's security information is available to logon to the corresponding resource.

The identity provider 104 provides a signed attestation to the user at client device 102a in response to a successful login at message 603. The client device then sends the signed attestation and the client device identifier to the vault service provider 108 at message 605. At 602, the vault service provider 108 validates the signed attestation and retrieves the SSOK key for the user and device identifier that was sent provided by the user during registration of the client device 102a. The vault service provider 108 sends the SSOK key corresponding to the user and device identifier pairing to the client device 102a at message 607. The vault service provider 108 may also send a session token. At 604, the client device 102a recovers a data key for the user's digital vault by using the SSOK to decrypt an EDK. At 606, the client device 102a uses the DK to access encrypted data in client device local storage as the user connects to resources on the internet to which the user is able to connect using the SSO authentication. The client device 102a recovers and stores the Data Key (DK) by decrypting the locally stored Encrypted Data Key (EDK) with the SSOK key: DK=Decrypt_SSOK(EDK). At 608, the client device 102a communicates with the vault service provider 108 using the session token provided by the vault service provider 108. With the DK key now in memory on the local client device, the vault service provider client device 102a may now decrypt the records stored on the local device.

FIG. 7 is a message flow diagram that illustrates operation of an example method for providing SSO authentication when a new account is created. The creation of the new account depicted in FIG. 7 may also include registration of the first client device 102a to be registered for the user. The user at client device 102a sends a login request to the IdP 104 at 701. It is noted that the user information and much of the account information is provided to the IdP 104 during configuration of the user's account with the IdP 104. The configuration may be of any individual user in any organized or unorganized community, or of a plurality of users operating within an enterprise. The user may have an account and/or profile on the IdP 104. In an example implementation, the IdP may generate the signed attestation for the user as well as an attestation public key (APK) for the user during configuration of the IdP 104. The user, having been verified by the IdP 104, sends the signed attestation in a communication to the vault service provider 108. The communication may also include a flag or identifier indicating that the client device 102a being used by the user is one that is not known, and therefore unregistered.

The user may be presented with the IdP 104 login page by direct request from the user, or by redirect from a user's attempt to log in to an associated resource. The user may send the signed attestation to the vault service provider 108 at message 705. At step 702, the vault service provider 108 verifies attestation using a configured public key (APK) for the IdP 104. Optionally, all new accounts and new devices can be sent to the administrator of an enterprise for approval at this point. This would permit administrators to see device-specific information (device type, OS version, MDM settings, et al) before approving.

At 704, the vault service provider 108 generates a symmetric single sign-on key (SSOK) to correspond with the user verified by the IdP 104 and the device identifier for the client device 102a. The vault service provider 108 sends the SSOK key and a session token to the client device 102a at message 707. The client device 102a then completes the steps to register as a device used by the user.

At 706. the client device 102a generates a new device identifier that may be used to identify the client device 102a. At 708, the client device 102a generates a data key (DK) for the user. At 710, the client device 102a generates an encrypted data key (EDK) using EDK={DK}_SSOK. At 312, the client device 102a may delete the SSOK from local storage.

Once the client device 102a is registered and paired with the user with an SSOK or data decryption key, the client device 102a may then generate, encrypt, and upload vault records normally using, for example, a Zero-Knowledge Vault Service Provider client and Vault Service Provider Cloud APIs.

FIG. 8 is a message flow diagram illustrating operation of an example method for adding a new unregistered client device 102b for a known user after a first client device 102a is registered. The user, at the unregistered client device 102b requests a login at the IdP 104 at message 801. The IdP 104 performs an attestation verification and sends a signed attestation at message 803 to the uninitialized client device 102b. The client device 102b sends the signed attestation (confirming the user was verified by the IdP 104) and an uninitialized device flag or indicator to the vault service provider 108 for validation of the signed attestation at message 805. The signed attestation is validated at 802. The vault services provider 108 may then request at message 807 that the user select an approval method for approving the new client device. One option that may be available in an example implementation involves displaying a list of existing registered client devices (possibly indicating which devices are currently logged in) to use as an approval client device 102c. Another option that may be presented to the user for selection involves requesting that an administrator, such as in an enterprise network, perform the approval. The client device 102b may communicate the selected approval mechanism at message 809.

In the meantime, the uninitialized client device 102b generates a device enrollment key pair at 808. The device enrollment key pair includes a device enrollment signing key (DESK) and a device enrollment public key (DEPK). The DESK is stored in local storage on the client device 102c. The DEPK is sent at message 811 to the vault service provider 108. The vault service provider 108 sends a push message at step 810 to the approval client device 102c selected by the user for approval. The push message at message 813 includes account information, device information, and the DEPK. At 812, the approval client device 102c receives the push message and may display the information to the user on the approval client device 102c with a request to approve the device, or not approve the device. It is noted that when the user selects the approval device at 804, the approval client device 102c may not be logged in or have an active data key. If not logged in, user must continue with the login process on the approval client device 102c.

It is noted that the selected "approval client device" can be either the user's other enrolled devices or a vault service provider administrator who has the authority to perform device approval. The "approval client device" can be another device owned by the user, or an administrator of the Enterprise account. The approval client device may also be a browser-based application.

The approval client device 102c contacts the vault service provider 108 and receives device information and public key for the new client device 102b. As noted above, the device information is presented to the user for approval at the approval client device 102c at 412. The user on the approval client device 102c either approves or rejects the new device. If client approves device, the approval client device 102c encrypts the data key at 814 with device public key and sends ciphertext to the vault service provider 108 at message 815 using: transport data key (TDK)={DK}_DEPK. The vault service provider 108 sends the transport data key ciphertext={DK}_DEPK, a newly generated SSOK key, and a session token to the uninitialized device 102b at message 817. The client device 102b uses the DESK to recover the data key (DK). The uninitialized client device 102b then completes a device enrollment process as follows:

a. Generates a unique Device ID at 820.
   b. Generates the Data Key (DK) at 820.
   c. Generates encrypted data key: EDK=SSOK at 822.
   d. EDK is stored locally on the user's device and is preferably not stored anywhere else.
   e. After the EDK is stored, the SSOK key is deleted at 824 from local memory in the client device 102b and never written to durable storage.

The newly initialized client device 102b may now generate, encrypt, and upload records to the vault service provider backend cloud normally using Vault Service Provider Cloud APIs.

From the client device or admin user interface, users and administrators may be displayed a list of devices that are approved to access the user account. users and administrators can also see a list of devices that are presently authenticated. To immediately revoke access to a device, the following process may be performed:

1. The user or administrator at a client device requests that a device be removed from a specific user account.
2. If the device has users that are presently logged in, the vault service provider 108 sends a push notification to the client device that requests that it scrub keys from memory and scrub ciphertext from durable storage.
3. The vault service provider marks the device ID as no longer valid for future authentication and deletes the associated Master Password from durable storage.
4. Even without scrubbing contents of a revoked device, this process may be referred to as "cryptographic erasure" and the remote device can be reported as erased. Without the Master Password, the encrypted data key (EDK) stored in the vault service provider is useless.

The example implementations described herein allow the user to easily recover the user account and registered device information. Account recovery may be required when a user loses access to all of their devices or their only device. The user may follow the process for adding a new client device message flow as described above with reference to FIGS. 4A, 4B and 8, and request device approval from the vault service provider administrator.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A computer-implemented method for facilitating a single sign-on to a digital vault provided by a vault service provider, comprising:
    performing a login for a user on a client device to an identity provider;
    receiving in response to the login at the identity provider a signed attestation generated by the identity provider confirming the identity of the user;
    sending the signed attestation and a device identifier to the vault service provider configured to validate the signed attestation;
    retrieving an encrypted data key (EDK) corresponding to the user and the client device identified by the device identifier while maintaining a zero-knowledge environment;
    decrypting the EDK key to generate a data key (DK) using a data decryption key corresponding to the user account and the client device obtained while maintaining a zero-knowledge environment;
    decrypting encrypted data records stored in a local storage using the data key and encrypting data to send to the vault service provider;
    wherein the data decryption key is a data private key (DPRIV) previously generated in a key pair with a data public key (DPUB) the DPRIV key is stored in local storage, and wherein the step of retrieving the EDK key includes:
        receiving the EDK key in a communication from the vault service provider upon confirmation of the identity of the user and the device by the identity provider, wherein the step of decrypting the EDK key includes decrypting the EDK key using the DPRIV key;
    wherein before the step of performing the login at the identity provider the method further comprises:
        generating the key pair comprising the DPRIV key and the DPUB key;
        storing the DPRIV key in local storage;
        sending the DPUB key to the vault service provider;
        receiving a unique device identifier corresponding to the client device from the vault service provider in response to receiving the DPUB key;
        connecting to the identity provider to register the client device for the user with the vault service provider;
        performing a login at the identity provider;
        receiving from the identity provider the signed attestation confirming the user's identity;
        sending the signed attestation to the vault service provider configured to verify the attestation using the attestation public key on the vault service provider;
        generating the data key (DK);
        encrypting the DK key using the DPUB key to generate the EDK key; and
        sending the EDK key to the vault service provider without storing the EDK key in a local storage of the client device.

2. The method of claim 1 further comprising:
    receiving a session token from the vault service provider; and
    using the session token in communications connections between the client device and the vault service provider.

3. The method of claim 1 where the step of receiving the signed attestation includes receiving the signed attestation as an attestation comprising a signature to be validated by the identity provider using an asymmetric attestation signing key.

4. The method of claim 3 where the step of receiving the signed attestation as the attestation signed by the identity provider by the attestation signing key as an asymmetric attestation signing key according to any of the RSA, ECDSA, or EDDSA.

5. The method of claim 1 where the step of decrypting the EDK key includes generating the DK key as a 256-bit or stronger ciphertext.

6. The method of claim 5 where the step of decrypting the EDK key includes generating the DK key according to the AES-GCM standard.

7. The method of claim 1 comprising:
    generating a second key pair comprising a second device DPRIV key and a second device DPUB key after installing a client application in an unregistered client device;
    storing the second device DPRIV key in local storage of the unregistered client device;
    sending the second device DPUB key to the vault service provider;
    receiving a second device identifier corresponding to the unregistered client device from the vault service provider in response to receiving the second device DPUB key;
    performing a login to the identity provider using the unregistered client device;
    receiving the signed attestation;

sending the signed attestation to the vault service provider configured to validate the signed attestation on the vault service provider;

determining an approval mechanism for approving the unregistered client device for registration with the user;

receiving a second device EDK key generated by the approval mechanism using the DK key of the user encrypted using the second device DPUB key; and decrypting the second device EDK key using the second device DPRIV key to complete registration of the unregistered device.

8. The method of claim 7 where the step of determining the approval mechanism comprises:

prompting the user on the unregistered client device for approval of an approval mechanism; and sending the selected approval mechanism to the vault service provider.

9. The method of claim 8 where the step of sending the selected approval mechanism includes sending device information for a previously registered client device registered with the vault service provider for the user.

10. The method of claim 8 where the step of sending the selected approval mechanism includes sending a default indicator to request the vault service provider to determine the approval mechanism from a plurality of registered client devices previously registered with the vault service provider for the user.

11. The method of claim 8 where the step of sending the selected approval mechanism includes sending a request for an admin to be the approval mechanism.

12. The method of claim 1 further comprising:

receiving an enterprise public key (EPUB) corresponding to the user from the vault service provider, where the EPUB key is part of an enterprise key pair generated by an admin, the enterprise key pair comprising the EPUB key and an enterprise private key (EPRIV) maintained by the admin;

generating an enterprise encrypted data key (ENTDK) by encrypting the DK key using the EPUB key; and sending the ENTDK key to the vault service provider for storage, where the vault service provider is configured to provide the ENTDK to the admin as an encrypted DK key corresponding to the user, where the admin approves the unregistered client device based on device and user information received from the vault service provider, decrypts the ENTDK key using the EPRIV key to generate the DK key, encrypts the DK key using the second device DPUB received from the vault service provider to generate a second EDK, and sends the second EDK to the vault service provider; and receiving the second EDK from the vault service provider to complete registration of the unregistered client device that is not a first client device to be registered corresponding to the user.

13. The method of claim 1 where the client device is a first client device, the method comprising:

sending a request to remove a second client device to the vault service provider;

receiving an acknowledgment of removal from the vault service provider, where the acknowledgment of removal is indicative that the second client device deleted the DK key and the vault service provider deleted the EDK key corresponding to the second client device and invalidated the device identifier corresponding to the second client device.

14. A computer-implemented method for facilitating a single sign-on to a digital vault by a user on a client device to a vault service provider, comprising:

receiving the signed attestation and a device identifier from the client device in response to the client device performing a login at an identity provider;

verifying the signed attestation using an attestation public key corresponding to the user and verifying the client device as registered with the vault service provider according to the device identifier;

sending an encrypted data key (EDK) corresponding to the user of the client device identified by the device identifier where the client device decrypts the EDK key to generate a data key corresponding to the user using a data private key (DPRIV) for accessing encrypted data records in a local storage of the client device;

sending a session token corresponding to registration of the client device to the client device; and receiving and sending communications between the client device and the vault service provider using the session token for downloading records;

receiving a data public key (DPUB) from a first client device corresponding to the user to request registration, where the DPUB key is part of a key pair with the DPRIV key;

generating the device identifier in response to receiving the DPUB key from the client device, where the vault service provider stores the DPUB key and the device identifier to correspond to the user and the client device;

sending the device identifier to the client device;

receiving the signed attestation and the device identifier to register the client device;

verifying the signed attestation using an attestation public key stored on the vault service provider;

receiving the EDK key generated by the client device using the DPRIV key to encrypt the DK key; and storing the EDK key, the DPUB key, and the device identifier to correspond to the user and the client device to register the client device.

15. The method of claim 14 where the step of receiving the signed attestation includes receiving a document having a signature signed by the identity provider using an asymmetric attestation signing key according to the RSA, ECDSA or EDDSA.

16. The method of claim 14 where the device identifier is a first device identifier, the key pair is a first device key pair, the DPRIV key is a first device DPRIV key, and the DPUB key is a first device DPUB key, where the method further comprises, before receiving the signed attestation:

receiving a second device data public key (DPUB) from an unregistered client device corresponding to the user to request registration, where the second device DPUB key is part of a second device key pair with a second device data private key (DPRIV);

generating a second device identifier in response to receiving the second device DPUB key from the unregistered client device, where the vault service provider stores the second device DPUB key and the second device identifier to correspond to the user and the unregistered client device;

sending the second device identifier to the client device;

receiving the signed attestation and the second device identifier in response to a login attempt by the user on the unregistered client device;

verifying the signed attestation using the attestation public key corresponding to the user and starting a device registration for the unregistered client device in response to receiving the second device identifier;

determining an approval mechanism;

sending a push message and device information including the second device DPUB key to the approval mechanism;

receiving a second device encrypted data key (EDK), where the second device EDK={DK} (second device DPUB), where DK key is the data key for the user and second device DPUB key is an encryption key used in encrypting DK key to generate EDK key;

sending the second device EDK key to the unregistered client device for decrypting using the second device DPRIV key on the unregistered client device; and storing the second device EDK key with the second device DPUB key and the second device identifier to complete registration of the unregistered client device.

17. The method of claim 16 where the step of determining an approval mechanism comprises:

receiving a selected approval mechanism comprising at least one device identifier corresponding to at least one registered client device corresponding to the user.

18. The method of claim 14 where the device identifier is a first device identifier, the key pair is a first device key pair, the DPRIV key is a first device DPRIV key, and the DPUB key is a first device DPUB key, where the method further comprises, before receiving the signed attestation:

sending a notice of registration of a first client device to an admin;

receiving an enterprise public key (EPUB) from the admin, where the EPUB key is part of an enterprise key pair with which the EPUB key is paired with an enterprise private key (EPRIV) stored in the admin;

sending the EPUB key to the first client device;

receiving a second device data public key (DPUB) from an unregistered client device corresponding to the user to request registration, where the second device DPUB key is part of a second device key pair with a second device data private key (DPRIV);

generating a second device identifier in response to receiving the second device DPUB key from the unregistered client device, where the vault service provider stores the second device DPUB key and the second device identifier to correspond to the user and the unregistered client device;

sending the second device identifier to the unregistered client device;

receiving an enterprise encrypted data key (ENTDK) from the first client device, where the ENTDK key is an encryption of the DK for the user using the EPUB key;

receiving the signed attestation and the second device identifier in response to a login attempt by the user on the unregistered client device;

verifying the signed attestation using an attestation public key corresponding to the user and starting a device registration for the unregistered client device in response to receiving the second device identifier; and sending a push message and device information including the ENTDK key and the second DPUB key to the admin, where the admin is determined to be an approval mechanism, where the admin validates the unregistered client device, decrypts the ENTDK key using the EPRIV key to generate the DK key corresponding to the user, encrypts the DK key corresponding to the user using the second DPUB key to generate a second encrypted data key (second EDK), and send the second EDK to the vault service provider;

receiving the second EDK from the admin; and sending the second EDK to the unregistered client device to register the unregistered client device.

\* \* \* \* \*